Patented Nov. 30, 1937

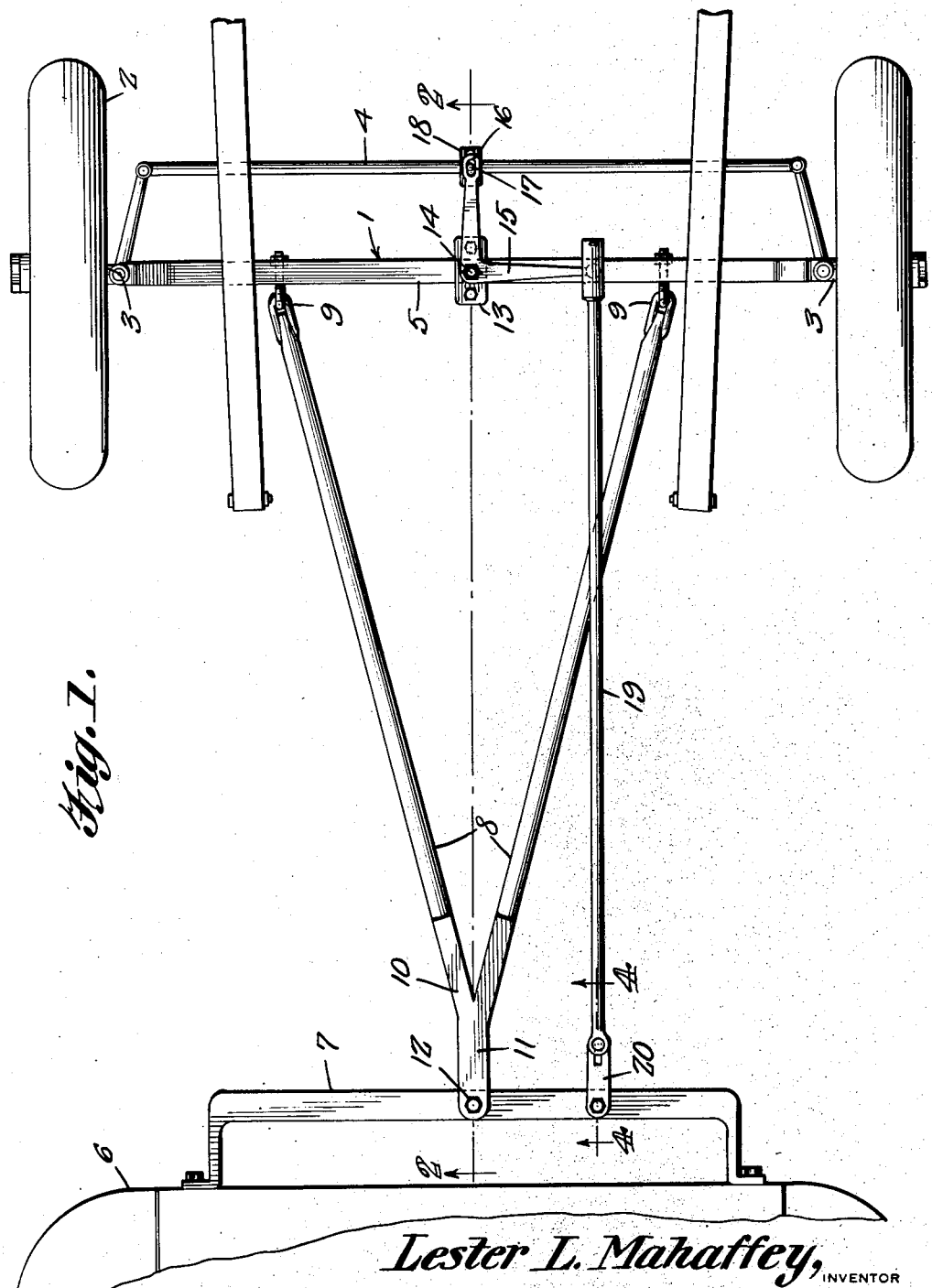

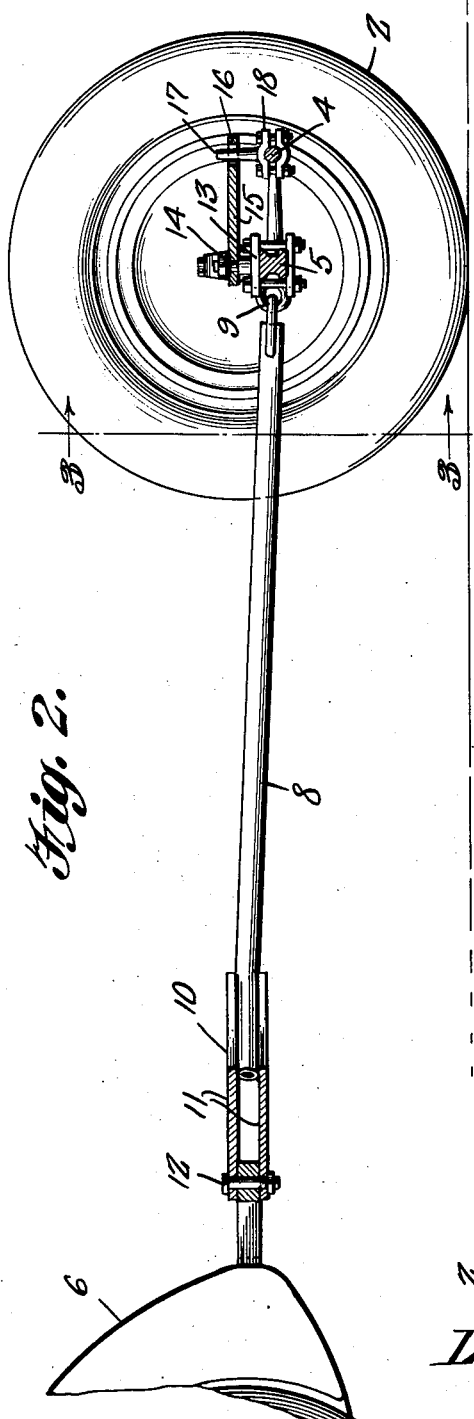
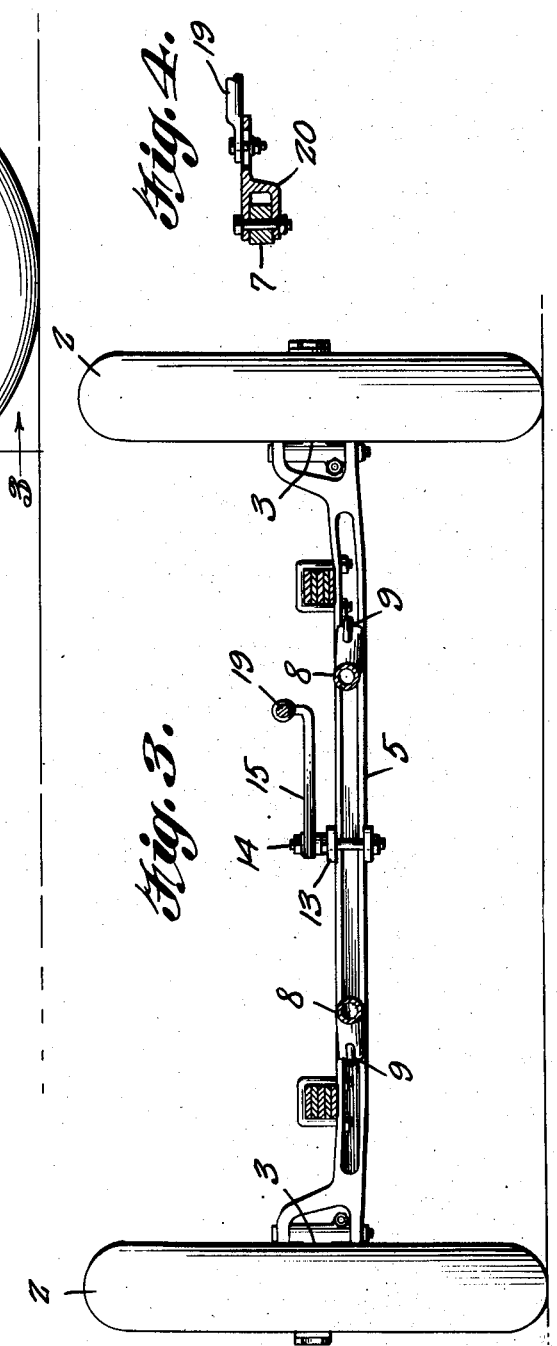

2,100,447

UNITED STATES PATENT OFFICE 2,100,447

TRAILER HITCH

Lester L. Mahaffey, Carrier, Okla.

Application December 16, 1935, Serial No. 54,745

1 Claim. (Cl. 280—33.55)

This invention relates to a trailer hitch, and has for the primary object the provision of a device of this character which will provide an efficient and detachable coupling between vehicles and will cause the towed vehicle to follow in the path of the towing vehicle without side sway or whip, the front or steering wheels of the towed vehicle being steered automatically by the direction of travel of the towing vehicle and further permit the towed vehicle to be readily backed by the towing vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view showing a trailer hitch constructed in accordance with my invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 1.

Referring in detail to the drawings, the numeral 1 indicates the front or steering end of a trailer or towed vehicle wherein the front wheels 2 are journaled on stub axles 3 connected together by a tie bar 4, the main axle being indicated by the numeral 5. The reference character 6 indicates a fragmentary portion of the rear end of a towing vehicle to which is secured and transversely arranged thereof an attaching bar 7. A V-shaped tongue or coupling bar 8 is pivotally and detachably connected to the main axle 5 of the trailer 1, as shown at 9, and the apex of the coupler has secured thereto an attaching portion 10 bifurcated to form spaced plates 11 adapted to straddle the attaching bar 7 and be pivotally and detachably connected thereto by a fastener 12. The fastener 12 is located intermediate the ends of the attaching bar 7.

Midway of the ends of the main axle 5 of the trailer 1 is removably mounted a clamp 13 having thereon an upstanding journal 14 acting as a pivot for a bell crank lever 15, one end of which is slotted, as shown at 16, to receive an upstanding pin 17 carried by a clamp 18 detachably connected to the connecting bar 4 of the trailer. The other end of the bell crank lever is in the form of a sphere received within a yieldable seat located at one end of a steering bar 19. The other end of the steering bar is pivotally and detachably connected to a bifurcated bracket 20 and is capable of having a limited sliding movement relative thereto. The bracket 20 is pivoted to the attaching bar 7 laterally of the pivot of the tongue or coupler 8 thereto. As the towing vehicle turns from a straight course, the steering bar 19 imparts movement to the connecting bar 4, which in turn acts on the stub axles 3 causing the steering wheels 2 of the trailer to follow in the path of the towing vehicle. The tongue 8 being of substantially V shape and connected to the towing and towed vehicles as heretofore described along with the steering means mentioned for the towed vehicle, the latter will be caused to track the towing vehicle without side sway or whip.

Having described the invention, I claim:

A trailer hitch comprising a V-shaped tongue having its ends pivotally and detachably connected to an axle of a trailer, a bifurcated plate secured to the apex of the tongue, an attaching bar secured to a towing vehicle and having the bifurcated plate pivotally and detachably connected thereto, a steering bar detachably and pivotally connected to the attaching bar, a bell crank lever pivoted to the axle of the trailer, a ball and socket joint connecting one end of the bell crank lever to the steering bar, a clamp secured to a steering mechanism of the trailer, the other end of said bell crank lever having a slot, and a pin carried by said clamp and extending through the slot.

LESTER L. MAHAFFEY.